US012647788B2

(12) United States Patent
Wang

(10) Patent No.: US 12,647,788 B2
(45) Date of Patent: Jun. 2, 2026

(54) SYSTEM AND METHOD TO SAVE POWER IN AN ACCESS POINT DEVICE

(71) Applicant: Thomson Licensing, Cesson-Sevigne (FR)

(72) Inventor: Liang Wang, Shenzhen (CN)

(73) Assignee: Thomson Licensing, Cesson-Sevigne (FR)

( * ) Notice: Subject to any disclaimer, the term of this patent is extended or adjusted under 35 U.S.C. 154(b) by 569 days.

(21) Appl. No.: 17/926,321

(22) PCT Filed: Jun. 8, 2020

(86) PCT No.: PCT/CN2020/094922
§ 371 (c)(1),
(2) Date: Nov. 18, 2022

(87) PCT Pub. No.: WO2021/248274
PCT Pub. Date: Dec. 16, 2021

(65) Prior Publication Data
US 2023/0239696 A1    Jul. 27, 2023

(51) Int. Cl.
*G08C 17/00*         (2006.01)
*G06F 1/3234*        (2019.01)
                    (Continued)

(52) U.S. Cl.
CPC ........ *H04W 12/084* (2021.01); *G06F 1/3234* (2013.01); *H04W 12/63* (2021.01); *H04W 12/73* (2021.01); *H04W 52/0206* (2013.01)

(58) Field of Classification Search
CPC ... G06F 1/3234; H04W 52/02; H04W 12/082; H04W 12/63; H04W 4/021; H04W 52/0206; H04W 12/084; Y02D 30/70
See application file for complete search history.

(56) References Cited

U.S. PATENT DOCUMENTS

| 10,187,745 B1 * | 1/2019 | Zhao ..................... H04W 4/021 |
| 2007/0226329 A1 * | 9/2007 | Moribe ................... H04L 12/66 |
| | | 709/223 |

(Continued)

FOREIGN PATENT DOCUMENTS

| CN | 107396349 | 11/2017 |

OTHER PUBLICATIONS

International Search Report and the Written Opinion of the International Searching Authority dated Feb. 25, 2021 in International (PCT) Application No. PCT/CN2020/094922.

*Primary Examiner* — Shantell L Heiber
(74) *Attorney, Agent, or Firm* — James Shead; David Todd Shoneman; Michael A. Pugel

(57) ABSTRACT

A home network controller includes a memory, a processor, an internal communication component and an external communication component. The home network controller is configured to: associate the home network controller with a wireless client device to establish a wireless network, communicate with the wireless client device over the wireless network, enable the wireless client device to communicate with an external network via the wireless network, operate the home network controller in a first mode, operate the home network controller in a second mode, switch operation of the home network controller from the first mode to the second mode based on a disassociation of the wireless client device, and switch operation of the home network controller from the second mode to the first mode based on receipt of an initiate signal from the external network via the external communication component.

12 Claims, 11 Drawing Sheets

(51) Int. Cl.
    *H04W 12/084*      (2021.01)
    *H04W 12/63*       (2021.01)
    *H04W 12/73*       (2021.01)
    *H04W 52/02*       (2009.01)

(56) References Cited

U.S. PATENT DOCUMENTS

| | | | |
|---|---|---|---|
| 2015/0024787 A1* | 1/2015 | Ben-Itzhak | H04W 12/02 |
| | | | 455/456.4 |
| 2015/0237658 A1* | 8/2015 | Fontaine | H04W 52/0206 |
| | | | 370/311 |

* cited by examiner

SYSTEM AND METHOD TO SAVE POWER IN AN ACCESS POINT DEVICE

BACKGROUND

Embodiments of the present disclosure relate to wireless networks.

SUMMARY

Aspects of the present disclosure are drawn to a home network controller for use with a wireless client device and for communicating with an external network, wherein the home network controller is able to receive, via the external network, an initiate signal instructed by the wireless client device. The home network controller includes a memory, a processor, an internal communication component, and an external communication component. The processor is configured to execute instructions stored on the memory to cause the home network controller to: associate the home network controller with the wireless client device to establish a wireless network, communicate with the wireless network client over the wireless network, enable the wireless client to communicate with the external network by way of the wireless network, operate the home network controller in a first mode, and operate the home network controller in a second mode. The internal communication component is configured to communicate with the wireless client device by way of the wireless network. The external communication component is configured to receive the initiate signal. The processor is further configured to execute the instructions on the memory to: switch operation of the home network controller from the first mode to the second mode based on a disassociation of the wireless client device; and switch operation of the home network controller from the second mode to the first mode based on receipt of the initiate signal from the external network via the external communication component.

In some embodiments, the processor is configured to shut off power to the internal communication component during operation of the wireless network in the second mode.

In some embodiments, the memory is configured to store client identification data related to registered client devices and unregistered client devices. Additionally, the processor is configured to switch operation of the home network controller from the second mode to the first mode based on receipt of the initiate signal from registered client devices, and not to switch operation of the home network controller from the second mode to the first mode on receipt of the initiate signal from unregistered client devices.

In some embodiments, the home network controller resides on a gateway device.

In some embodiments, the home network controller resides on an access point device (APD).

Other aspects of the present disclosure are drawn to a method of operating a home network controller for use with a wireless client device and for communicating with an external network, wherein the home network controller being able to receive, via the external network, an initiate signal instructed by the wireless client device. The method includes: associating, via a processor configured to execute instructions stored on the memory, the home network controller with the wireless client device to establish a wireless network; communicating, via internal communication component, with the wireless client device by way of the wireless network; operating, via the processor, the home network controller in a first mode; operating, via the processor, the home network controller in a second mode based on a disassociation with the wireless client device; receiving, via an external communication component, an initiate signal from the wireless client by way of the external network; and operating, via the processor and based on receipt of the initiate signal, the home network controller in the first mode.

In some embodiments, operating the home network controller in a second mode comprises shutting off, via the processor, power to the internal communication component.

In some embodiments, the method further includes: storing, via the memory, client identification data related to registered client devices and unregistered client devices; operating the home network controller in the first mode based on receipt of the initiate signal from registered client devices; and does not include operating the home network controller in the first mode based on receipt of the initiate signal from unregistered client devices.

In some embodiments, the method includes the home network controller residing on a gateway device.

In some embodiments, the method includes the home network controller residing on an APD.

Other aspects of the present disclosure are drawn to a non-transitory, computer-readable media having computer-readable instructions stored thereon. The computer-readable instructions are capable of being read by a home network controller for use with a wireless client device and for communicating with an external network, the home network controller being able to receive, via the external network, an initiate signal provided by the wireless client device, wherein the computer-readable instructions are capable of instructing the computer to perform the method: associating, via a processor configured to execute instructions stored on a memory, the home network controller with the wireless client device to establish a wireless network; communicating, via an internal communication component, with the wireless client device by way of the wireless network; operating, via the processor, the home network controller in a first mode; selectively disassociating, via the processor, with the wireless client device; operating, via the processor, the home network controller in a second mode based on a disassociation with the wireless client device; receiving, via an external communication component, an initiate signal from the wireless client by way of the external network; and operating, via the processor and based on receipt of the initiate signal, the home network controller in the first mode.

In some embodiments, a non-transitory, computer-readable media includes the computer-readable instructions capable of instructing the computer to perform the method of operating the home network controller in a second mode which includes shutting off, via the processor, power to the internal communication component.

In some embodiments, the non-transitory, computer-readable media includes the computer-readable instructions capable of instructing the computer to additionally perform the method including: storing, via the memory, client identification data related to registered client devices and unregistered client devices; operating the home network controller in the first mode based on receipt of the initiate signal from registered client devices; and not operating the home network controller in the first mode based on receipt of the initiate signal from unregistered client devices.

In some embodiments, the non-transitory, computer-readable media includes the computer-readable instructions capable of instructing the computer to perform the method wherein the home network controller resides on a gateway device.

In some embodiments, the non-transitory, computer-readable media includes the computer-readable instructions capable of instructing the computer to perform the method wherein the home network controller resides on an APD.

Other aspects of the present disclosure are drawn to a non-transitory, computer-readable media having computer-readable instructions stored thereon. The computer-readable instructions are capable of being read by a client device for use with a home network controller, to communicate with the gateway via an external network and to communicate with the home network controller via a wireless network, wherein the computer-readable instructions are capable of instructing the client device to perform the method: associating, via a processor configured to execute instructions stored on a memory, with the home network controller by way of the wireless network so as to enable wireless communication with the external network by way of the wireless network; determining, via a positioning component, a first location while the wireless network is established; disassociating, via the processor, from the home network controller; determining, via the positioning component, that a location of the client device is a predetermined distance from the first location; transmitting, via an external network component, an initiate signal to the gateway via the external network when the location of the client device is less than or equal to the predetermined distance from the first location; and re-associating, via the processor, with the home network controller by way of the wireless network so as to re-enable wireless communication with the external network by way of the wireless network.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

In a conventional wireless communication network, the APDs within the communication network are constantly broadcasting network management messages (SSID messages) to maintain the wireless network even when there are no active clients. This wastes power when no client devices are connected to the network. Furthermore, this constant broadcasting of SSID messages leaves the network vulnerable to intruders with malicious intent when the network is left unmonitored.

Figure 1A:
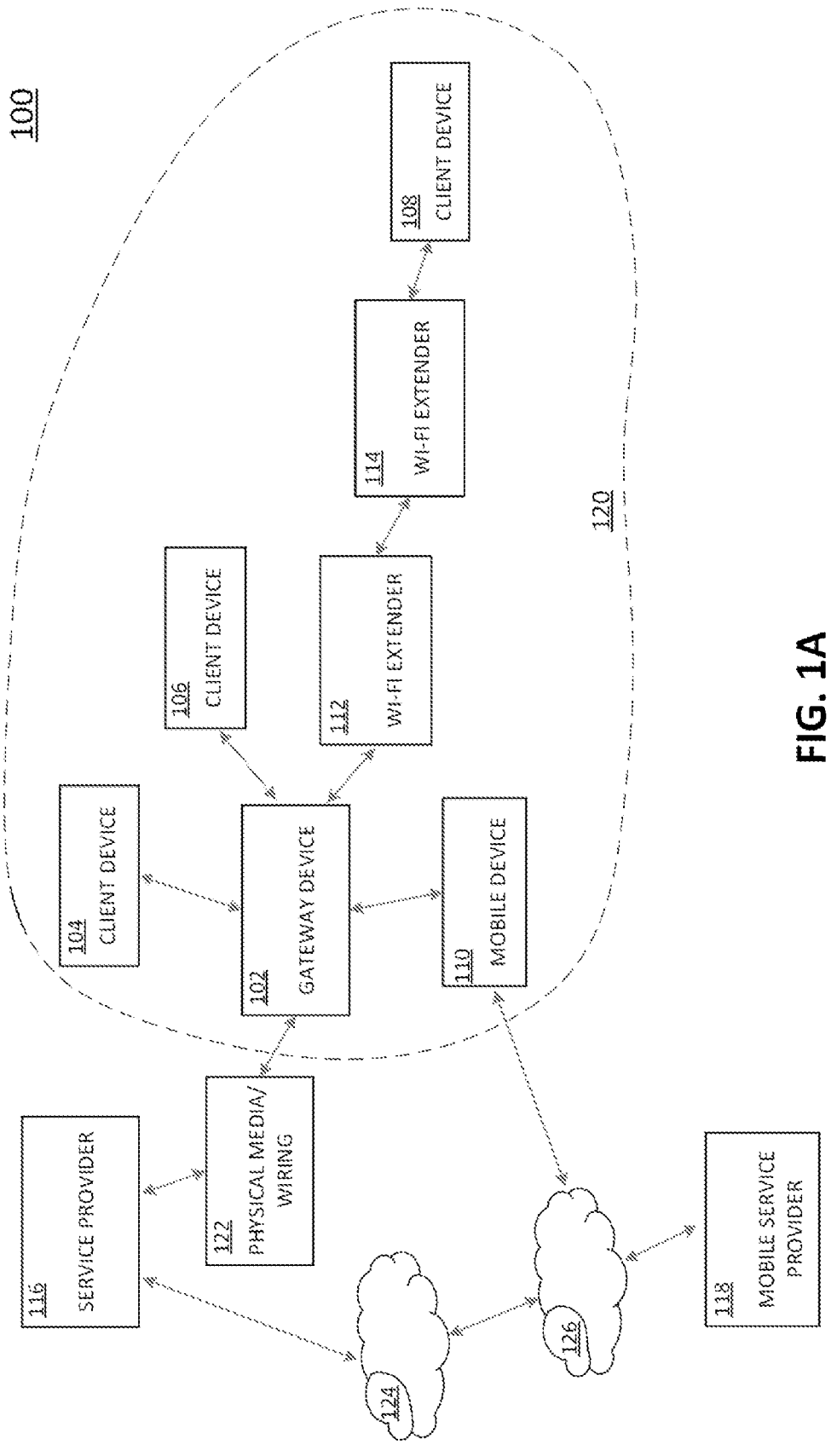
FIG. 1A illustrates structural components implementing an electronic communication network.

FIG. 1A illustrates structural components implementing an electronic communication network 100 at a time $t_0$. Electronic communication network 100 includes: a gateway device 102; a plurality of client devices, a sample of which are illustrated as a client device 104, a client device 106, and a client device 108; a plurality of mobile devices, a sample of which is illustrated as a mobile device 110; a plurality of Wi-Fi extenders, a sample of which are illustrated as a Wi-Fi extender 112 and a Wi-Fi extender 114; a service provider 116; a mobile service provider 118; a wireless local area network (WLAN) 120; an external network 124, e.g., the Internet; and a mobile network 126.

Gateway device 102, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein. Gateway device 102 may be any device or system that is operable to allow data to flow from one discrete network to another, which in this example is from WLAN 120 in figure to external network 124, e.g., the Internet. Gateway device 102 may perform such functions as inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 102 establishes, or is part of, WLAN 120, using Wi-Fi for example, such that client devices 104, 106, 108, mobile device 110, and Wi-Fi extenders 112 and 114 are able to communicate wirelessly with gateway device 102. In particular, gateway device 102 is able to communicate wirelessly directly with client devices 104, 106, mobile device 110, and Wi-Fi extender 112. Further, gateway device 102 is able to communicate wirelessly with Wi-Fi extender 114 via Wi-Fi extender 112 and is able to communicate wirelessly with client device 108 via Wi-Fi extender 112 and Wi-Fi extender 114. The term Wi-Fi as used herein may be considered to refer to any of Wi-Fi 4, 5, 6, 6E, or any variation thereof.

Further, it should be noted that gateway device 102 is able to communicate with service provider 116 via physical media/wiring 122, which may optionally be a wireless communication system, such as 4G, or 5G, and further is able to connect to external network 124, e.g., the Internet, via service provider 116.

Service provider 116 includes head-end equipment such as server computers (e.g., automatic configuration server ACS, cable modem termination system CMTS) that enable a service provider, such as a cable television provider, a satellite television provider, an Internet service provider, or multiple-systems operator (MSO), to provide content (such as audio/video content and/or Internet service) either through physical media/wiring 122, such as a coaxial network, an optical fiber network, and/or DSL, or external network 124, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g., FTTH (fiber to the home), FTTX (fiber to the X), or hybrid fiber-coaxial (HFC)), a digital subscriber line (DSL), a public switched data network (PSDN), a global Telex network, or a 2G, 3G, 4G, or 5G, for example.

Gateway device 102 serves as a gateway or access point to external network 124, e.g., the Internet (or otherwise as mentioned above), for one or more electronic devices, referred to generally herein as client devices 104, 106, 108, and mobile device 110 that wirelessly communicate with gateway device 102 via, e.g., Wi-Fi. Client devices 104, 106, 108, and mobile device 110 can be desk top computers, laptop computers, electronic tablet devices, smart phones, appliances, or any other so-called Internet-of-things equipped devices that are equipped to communicate information via WLAN 120.

Wi-Fi extenders 112 and 114 can be paired with gateway device 102 in order to communicate wirelessly with gateway device 102 and extend the coverage area of WLAN 120. Any of the client devices 104, 106, 108, and mobile device 110 can be in communication with gateway device 102 or any of Wi-Fi extenders 112 and 114. Mobile device 110 can also have a wireless data communication via mobile network 126 e.g., 3G, LTE, 4G, 5G, etc., with a mobile service provider 118.

Gateway device 102 has the capability of wirelessly communicating with plural electronic user devices over respective communication avenues. In order to extend the area in which WLAN 120 is effective, beyond the radio reach of gateway device 102, one of Wi-Fi extenders 112 and 114 can be added. The establishment of the operative communications between a Wi-Fi extender 112 and gateway device 102 (or between Wi-Fi extender 114 and an already established Wi-Fi extender 112) is referred to as onboarding the extender. The Wi-Fi extenders 112 and 114 can communicate wirelessly with gateway device 102. However, rather than using one of the communication avenues that are allocated for communication with user devices, a dedicated avenue of communication may be established, at least at some times, between the extender and gateway device 102. This dedicated avenue is referred to as a backhaul.

Within WLAN 120, electronic devices are often referred to as being stations in WLAN 120. In IEEE 802.11 (Wi-Fi) terminology, a station (abbreviated as STA) is a device that has the capability to use the 802.11 protocol. For example, a station may be a laptop, a desktop PC, PDA, access point, or Wi-Fi phone. An STA may be fixed, mobile, or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as a logical entity that is a singly addressable instance of a medium access control (MAC) and physical layer (PHY) interface to the wireless medium (WM).

A wireless access point (WAP), or more generally known as access point (AP), is a hardware networking device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 120, gateway device 102, Wi-Fi extender 112, and Wi-Fi extender 114 are access points for WLAN 120.

Figure 2:
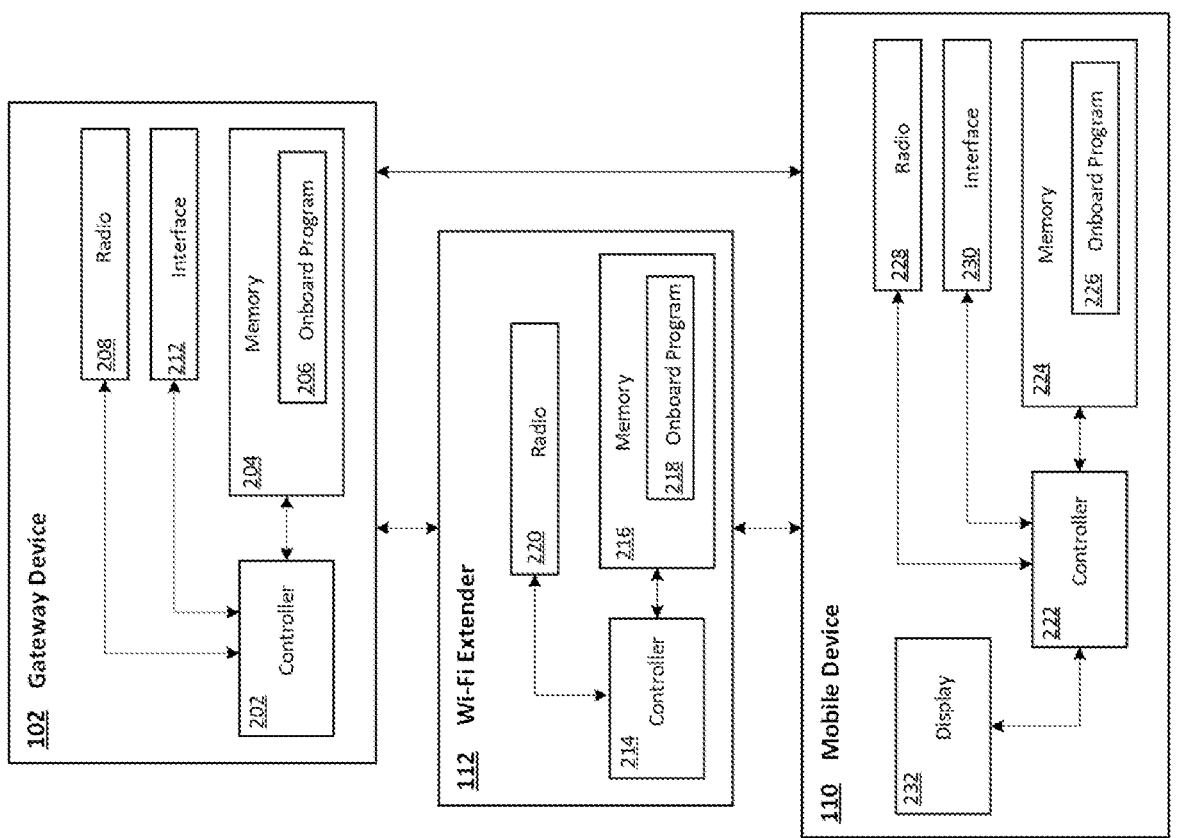
FIG. 2 illustrates an exploded view of the gateway device, the Wi-Fi extender, and the mobile device in the communication network of FIG. 1A.

FIG. 2 illustrates an exploded view of gateway device 102, Wi-Fi extender 112, and mobile device 110 of FIG. 1A.

As shown in FIG. 2, gateway device 102 includes: a controller 202; a memory 204, which has stored therein an onboarding program 206; at least one radio, a sample of which is illustrated as a radio 208; and an interface circuit 210.

In this example, controller 202, memory 204, radio 208, and interface circuit 210 are illustrated as individual devices. However, in some embodiments, at least two of controller 202, memory 204, radio 208, and interface circuit 210 may be combined as a unitary device. Whether as individual devices or as combined devices, controller 202, memory 204, radio 208, and interface circuit 210 may be implemented as any combination of an apparatus, a system and an integrated circuit. Further, in some embodiments, at least one of controller 202, memory 204, and interface circuit 210 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with a computer system/ server include, but are not limited to, personal computer systems, server computer systems, thin clients, thick clients, handheld or laptop devices, multiprocessor systems, micro-processor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 202 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 102 in accordance with the embodiments described in the present disclosure. Memory 204 can store various programming, and user content, and data. Interface circuit 210 can include one or more connectors, such as RF connectors, or Ethernet connectors, and/or wireless communication circuitry, such as 5G circuitry and one or more antennas. Interface circuit 210 receives content from service provider 116 (as shown in FIG. 1) by known methods, non-limiting examples of which include terrestrial antenna, satellite dish, wired cable, DSL, optical fibers, or 5G as discussed above. Through interface circuit 210, gateway device 102 receives an input signal, including data and/or audio/video content, from service provider 116 and can send data to service provider 116.

Radio 208, (and preferably two or more radios), may also be referred to as a wireless communication circuit, such as a Wi-Fi WLAN interface radio transceiver and is operable to communicate with client devices 104, 106 and 108, with mobile device 110, and with Wi-Fi extenders 112 and 114. Radio 208 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Wi-Fi extender 112 includes: a controller 214; a memory 216, which has stored therein an onboarding program 218; and at least one radio, a sample of which is illustrated as a radio 220. It should be noted that additional Wi-Fi extenders, including Wi-Fi extender 114, have similar structure and operation to that of Wi-Fi extender 112.

In this example, controller 214, memory 216 and radio 220 are illustrated as individual devices. However, in some embodiments, at least two of controller 214, memory 216, and radio 220 may be combined as a unitary device. Further, in some embodiments, at least one of controller 214 and memory 216 may be implemented as a computer having tangible computer-readable media for carrying or having computer-executable instructions or data structures stored thereon.

Controller 214 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the Wi-Fi extender 112 in accordance with the embodiments described in the present disclosure. Memory 216 can store various programming, and user content, and data. Radio 220, such as a Wi-Fi WLAN interface radio transceiver, is operable to communicate with client devices 104, 106 and 108, with mobile device 110 and with gateway device 102, as shown in FIG. 1A. Radio 220 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Wi-Fi extender 112 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Mobile device 110 includes: a controller 222; a memory 224, which has stored therein an onboarding program 226; and at least one radio, a sample of which is illustrated as a radio 228; an interface 230; and a display 232.

In this example, controller 222, memory 224, radio 228, interface 230, and display 232 are illustrated as individual devices. However, in some embodiments, at least two of controller 222, memory 224, radio 228, interface 230, and display 232 may be combined as a unitary device. Further, in some embodiments, at least one of controller 222 and memory 224 may be implemented as a computer having tangible computer-readable media for carrying or having computer-executable instructions or data structures stored thereon.

Controller 222, which can include a dedicated control circuit, CPU, microprocessor, etc., controls the circuits of mobile device 110. Memory 224 can store various programming, and user content, and data. Radio 228 may include a Wi-Fi WLAN interface radio transceiver that is operable to communicate with client devices 104, 106 and 108, with Wi-Fi extenders 112 and 114, and with gateway device 102, as shown in FIG. 1A and also may include a cellular transceiver operable to communicate with mobile service provider 118 through mobile network 126. Radio 228 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Mobile device 110 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Any of the client devices within WLAN 120 may be a mobile device similar to mobile device 110. In the event that a client device within WLAN 120 is not a mobile device similar to mobile device 110, such a client device may still include: a controller, which can include a dedicated control circuit, CPU, microprocessor, etc., and that controls the circuits of the client device; a memory, which has stored therein an onboarding program, that is similar to memory 224 and onboarding program 226, respectively, of mobile device 110 discussed above; a radio similar to radio 228 of mobile device 110 discussed above; in additional to further functional circuitry. Accordingly, any of the client devices may include a Wi-Fi WLAN interface radio transceiver, that is operable to communicate with other client devices, with Wi-Fi extenders 112 and 114, and with gateway device 102, as shown in FIG. 1A and also may include a cellular transceiver operable to communicate with mobile service provider 118 through mobile network 126. Further, any of the client devices may include a radio that is similar to radio 228 of mobile device 110 discussed above. Still further, any of the client devices may be equipped with a radio to implement a Bluetooth interface radio transceiver and antenna, or with a radio meeting RF4CE protocol, Zigbee protocol, and/or IEEE 802.15.4 protocol, which also communicates in the ISM band, in a manner similar to mobile device 110 discussed above.

Insofar as gateway device 102 provides connection to service provider 116, such as an MSO, gateway device 102 can be equipped with connectors to connect with a television or display device, and can also include programming to execute an electronic program guide and/or other suitable graphical user interface (GUI), and can with such configuration be referred to as a so-called set top box. Such a set top box can be included in the system shown in FIG. 1A as gateway device 102 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

As shown in FIG. 1A, client devices 104, 106, and 108 with mobile device 110 are connected to WLAN 120 and able to communicate with one another via gateway device 102 and Wi-Fi extenders 112 and 114. Additionally, they are also able to communicate to external networks such as external network 124 and mobile network 126 by way of gateway device 102. Furthermore, they may or may not disassociate with gateway device 102 and Wi-Fi extenders 112 and 114. For example, client devices 104 and 108 with mobile device 110 may disassociate with gateway device 102 and leave WLAN 120. This will be described in greater detail with reference to FIG. 1B.

Figure 1B:
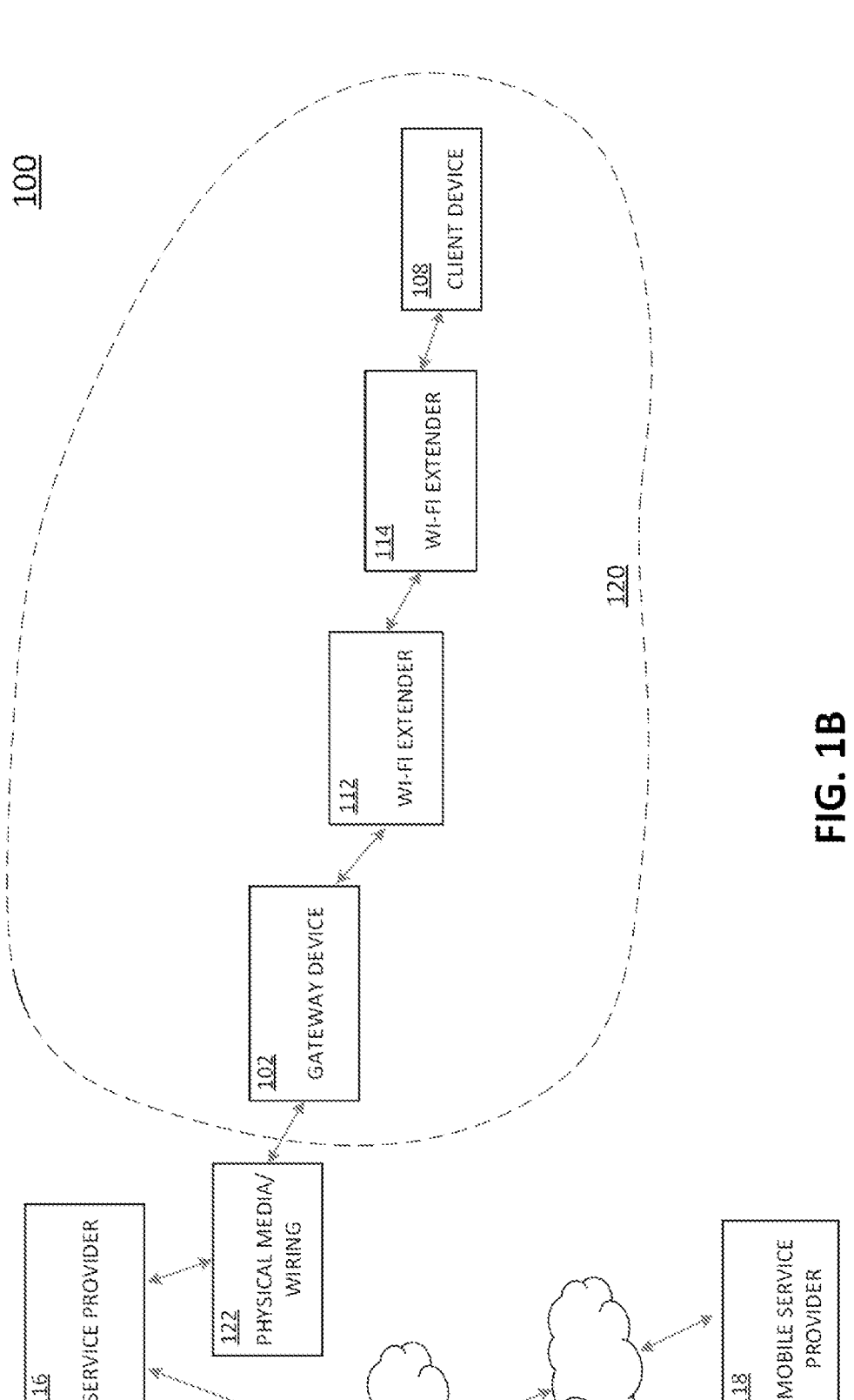
FIG. 1B illustrates the communication network in FIG. 1A at time $t_1$.

FIG. 1B illustrates communication network 100 at time $t_1$. As shown in the figure, client device 104, client device 106, and mobile device 110 are no longer connected to WLAN 120 at time $t_1$.

In this example, client device 104, client device 106, and mobile device 110 have disassociated from their respective APD, gateway device 102, and, in turn, disconnected with WLAN 120 at time $t_1$. However, device client 108 remains associated with Wi-Fi extender 114 and remains connected to WLAN 120. Nevertheless, client device 108 may decide to leave WLAN 120 at later time. This will be described in reference to FIG. 1C.

Figure 1C:
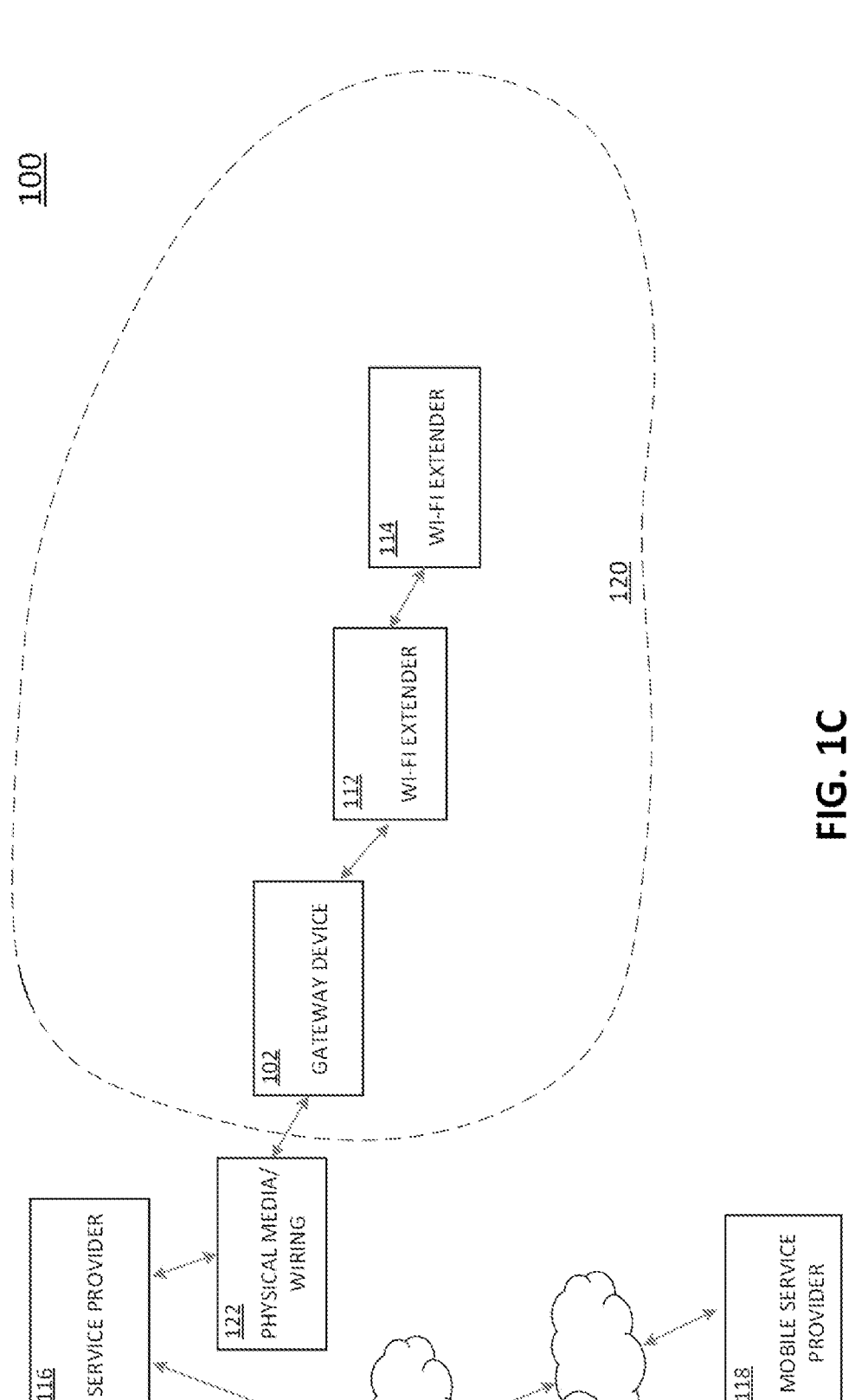
FIG. 1C illustrates the communication network in FIG. 1A at time $t_2$.

FIG. 1C illustrates communication network 100 at time $t_2$. As shown in the figure, client device 108 is no longer active in WLAN 120.

As shown in FIG. 1C, at time $t_2$, there are no client devices connected WLAN 120; however, WLAN 120 still remains active. Additionally, gateway device 102, Wi-Fi extender 112, and Wi-Fi extender 114 continue to operate in active mode even when no clients are associated. They are still broadcasting SSID messages, which can potentially invite unauthorized clients to join the network. In a situation when no one is at home or WLAN 120 is without any supervision, WLAN 120 becomes an easy target for hackers to attack and possibly access for malicious intent.

What is needed is a system and method for saving power in a wireless network while unattended.

A system and method in accordance with the present disclosure saves power in a wireless network while unattended.

In accordance with the present disclosure, the present disclosure automatically turns off a Wi-Fi network when there are no active users and then turns the Wi-Fi network back on when a user returns. By only turning on the Wi-Fi network when users are connected, much power is saved.

An example of a need for implementation of a system in accordance with the present disclosure is in a private home network, wherein during the day, everyone is outside either at school or at work, and the network is unattended. After the last client device disassociated from the home network, e.g., the last person of the home leaves the home with their smartphone, a home network controller is notified that the last registered client device has disassociated. The home network controller will notify all APDs to disable all radios, essentially turning off the Wi-Fi. This event will minimize power consumption of the home network when no client devices are connected to the network and also secure the home network from unwanted access from intruders.

Continuing with this example, now suppose later in the evening, the homeowners start returning home. When a first client device, e.g., a smartphone of the first returning homeowner, comes within a predetermined distance of the home network, the home network controller will be notified with an initiate signal from the registered mobile client by way of a mobile service provider. The home network controller will then instruct all APDs in the home network to enable their radios, essentially turning on the Wi-Fi, and start broadcasting SSID messages. By the time the first client device arrives at the residence, the Wi-Fi network will be up and running, the first client device will detect the Wi-Fi, and will be able to login to the home network.

An example system and method for saving power in a wireless network in accordance with aspects of the present disclosure will now be described in greater detail with reference to FIGS. 3-6.

Figure 3:
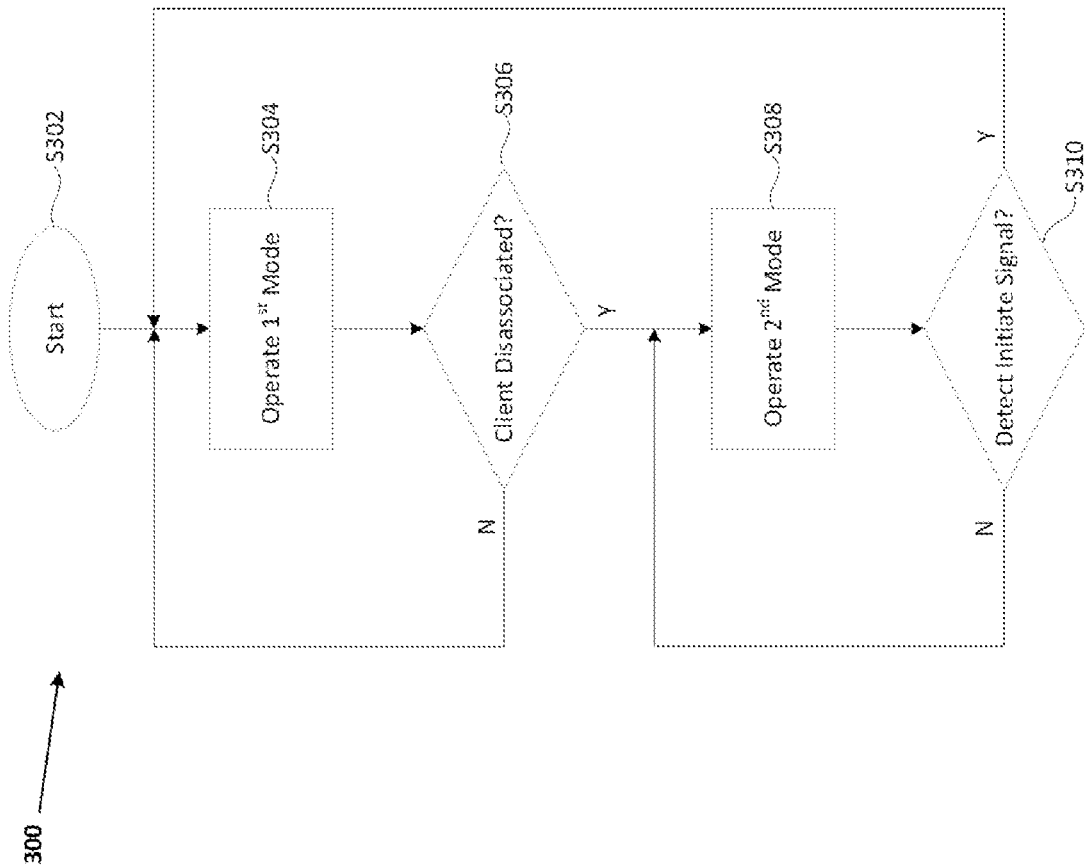
FIG. 3 illustrates an example method for managing operation modes of a communication network, in accordance with aspects of the current disclosure.

FIG. 3 illustrates an example method 300 for managing operation modes of a Wi-Fi network, in accordance with aspects of the current disclosure.

As shown in FIG. 3, method 300 starts (S302) and the Wi-Fi network is operating in the first mode (S304). This will be further described with additional references to FIG. 4A through FIG. 5.

Figure 4A:
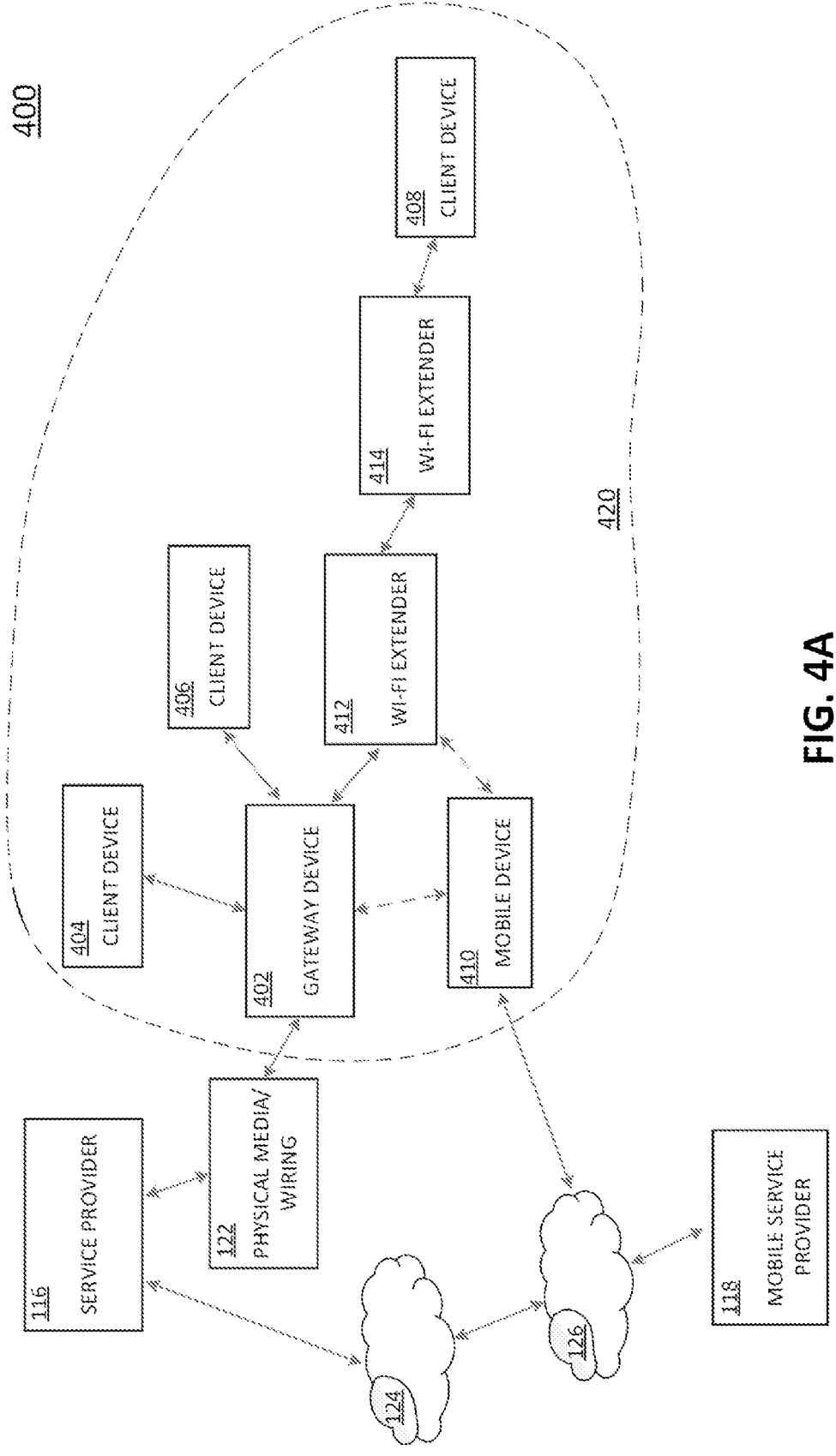
FIG. 4A illustrates structural components implementing a wireless network, in accordance with aspects of the current disclosure.

FIG. 4A illustrates a wireless network 400 at a time $t_3$, in accordance with aspects of the present disclosure.

As shown in the figure, wireless network 400 includes: a gateway device 402; a plurality of client devices, a sample of which are illustrated as a client device 404, a client device 406 and a client device 408; a plurality of mobile devices, a sample of which is illustrated as a mobile device 410; a plurality of Wi-Fi extenders, a sample of which are illustrated as a Wi-Fi extender 412 and a Wi-Fi extender 414; a service provider 116; a mobile service provider 118; a wireless local area network (WLAN) 420; a physical media/wiring 122; external network 124; and mobile network 126.

Gateway device 402 is arranged to communicate with service provider 116 via physical media/wiring 122, with external network 124 via service provider 116, with client device 404 and 406, with mobile device 410, and with Wi-Fi extender 402. Furthermore, gateway device 402 is able to communicate with Wi-Fi extender 414 via Wi-Fi extender 412, and client device 408 via Wi-Fi extender 414. Wi-Fi extender 412 is additionally arranged to communicate with Wi-Fi extender 414. Wi-Fi extender 414 is additionally arranged to communicate with client device 408.

As shown in FIG. 4A, client device 404, client device 406, client device 408, and mobile device 410 are connected to WLAN 420 and able to communicate with one another via gateway device 402 and Wi-Fi extenders 412 and 414. Additionally, they are also able to communicate to external networks such as external network 124 and mobile network 126 by way of gateway device 402. Furthermore, they may disassociate with gateway device 402 and Wi-Fi extenders 412 and 414 and disconnect with WLAN 420 at any given time. For example, client device 404, client device 406, and client device 408 may disassociate with their respective APDs and leave WLAN 420. This will be described in greater detail with reference to FIG. 4B.

Figure 5:
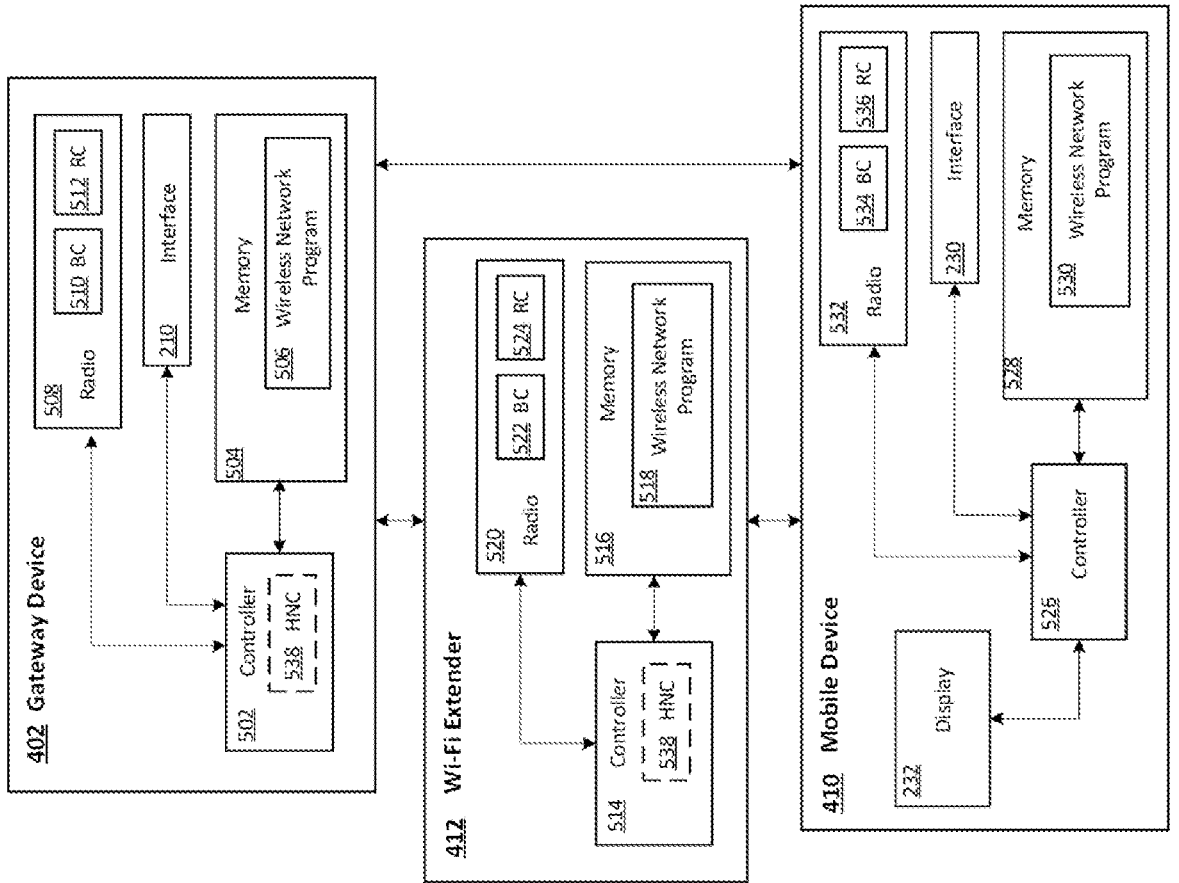
FIG. 5 illustrates an exploded view of the gateway device, the Wi-Fi extender, and the mobile device in the communication network of FIG. 4A.

FIG. 5 illustrates an exploded view of gateway device 402, Wi-Fi extender 412, and mobile device 410 of FIG. 4A.

As shown in FIG. 5, gateway device 402 includes: a controller 502, in some embodiments, includes a home network controller (HNC) 538; a memory 504, which has stored therein a wireless network program 506; at least one radio, a sample of which is illustrated as a radio 508, which includes a broadcasting component (BC) 510 and a receiving component (RC) 512; and an interface circuit 210.

In this example, controller 502, memory 504, radio 508, and interface circuit 210 are illustrated as individual devices. However, in some embodiments, at least two of controller 502, memory 504, radio 508, and interface circuit 210 may be combined as a unitary device. Whether as individual devices or as combined devices, controller 502, memory 504, radio 508, and interface circuit 210 may be implemented as any combination of an apparatus, a system and an integrated circuit. Further, in some embodiments, at least one of controller 502, memory 504, and interface circuit 210 may be implemented as a computer having non-transitory computer-readable media for carrying or having computer-executable instructions or data structures stored thereon.

Controller 502 can include a dedicated control circuit, CPU, microprocessor, etc. Controller 502 controls the circuits of gateway device 402. In some embodiments, HNC 538 resides inside controller 502 of gateway device 402. HNC 538 manages onboarding and routing of client devices and APDs. Note that, HNC 538 can reside in any APDs or even the gateway device; however, there should be only one instance of HNC running in the network. In this example, HNC 538 resides in controller 502 of gateway device 402; however, as will be described in greater detail below, it may also optionally reside in any APDs, for example, Wi-Fi extender 412.

Memory 504 can store various programming, and user content, and data as wireless network program data 506. As will be discussed in more detail below, wireless network program data 506 includes instructions that may be used by controller 502 to cause gateway device 402 to associate gateway device 402 with mobile device 410 to establish WLAN 420, to communicate with mobile device 410 over WLAN 420, to enable mobile device 410 to communicate with external network 126 by way of WLAN 420, to operate gateway device 402 in a first mode, to operate gateway device 402 in a second mode, to switch operation of gateway device 402 from the first mode to the second mode based on a dissociation of mobile device 410, and to switch operation of gateway device 402 from second mode to the first mode based on receipt of the initiate signal from external network 126 via external network 124 and service provider 116.

As will be discussed in more detail below, wireless network program data 506 may additionally include instructions that may be used by controller 502 to cause gateway device 402 to further shut off power to Wi-Fi extenders 412 and 414 during operation of WLAN 420 in the second mode.

As will be discussed in more detail below, wireless network program data 506 may additionally include instructions that may be used by controller 502 to cause gateway device 402 to further store client identification data related to registered client devices and unregistered client devices, to switch operation of gateway device 402 from the second mode to the first mode based on receipt of the initiate signal from registered client devices but not to switch operation of gateway device 402 from the second mode to the first mode based on receipt of the initiate signal from unregistered client devices.

Interface circuit 210 can include one or more connectors, such as RF connectors, or Ethernet connectors, and/or wireless communication circuitry, such as 5G circuitry and one or more antennas. Interface circuit 210 receives content from service provider 116 (as shown in FIG. 4A) by known methods, non-limiting examples of which include terrestrial antenna, satellite dish, wired cable, DSL, optical fibers, or 5G as discussed above. Through interface circuit 210, gateway device 502 receives an input signal, including data and/or audio/video content, from service provider 116 and can send data to service provider 116.

Radio 508, (and preferably two or more radios), may also be referred to as a wireless communication circuit, such as a Wi-Fi WLAN interface radio transceiver and is operable to communicate with client devices 404, 406, and 408, with mobile device 410, and with Wi-Fi extenders 412 and 414. Radio 508 includes BC 510, RC 512 with one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 402 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Wi-Fi extender 412 includes: a controller 514; a memory 516, which has stored therein a wireless network program data 518; and at least one radio, a sample of which is illustrated as a radio 520, which has stored therein a BC 522 and an RC 524. It should be noted that additional Wi-Fi extenders, including Wi-Fi extender 414, have similar structure and operation to that of Wi-Fi extender 412.

In this example, controller 514, memory 516, and radio 520 are illustrated as individual devices. However, in some embodiments, at least two of controller 514, memory 516 and radio 520 may be combined as a unitary device. Further, in some embodiments, at least one of controller 514 and memory 516 may be implemented as a computer having tangible computer-readable media for carrying or having computer-executable instructions or data structures stored thereon.

Controller 514, which can include a dedicated control circuit, CPU, microprocessor, etc., controls the circuits of Wi-Fi extender 412. In some embodiments, HNC 538 may reside in controller 514 of Wi-Fi extender 412.

Memory 516 can store various programming, and user content, and data as wireless network program data 518. As will be discussed in more detail below, wireless network program data 506 includes instructions that may be used by controller 514 to cause Wi-Fi extender 412 to associate Wi-Fi extender 412 with mobile device 410 to establish WLAN 420, to communicate with mobile device 410 over WLAN 420, and to enable mobile device 410 to communicate with external network 126 by way of WLAN 420. Further, wireless network program data 518 also includes instructions to switch operation of Wi-Fi extender 412 from the first mode to the second mode based on a dissociation of mobile device 410 and to switch operation of Wi-Fi extender 412 from second mode to the first mode based on receipt of the initiate signal from external network 126 via external network 124 and service provider 116.

As will be discussed in more detail below, wireless network program data 518 includes instructions that may be used by controller 514 to cause Wi-Fi extender 412 to further shut off power to Wi-Fi extender 414 during operation of WLAN 420 in the second mode.

As will be discussed in more detail below, wireless network program data 518 includes instructions that may be used by controller 514 to cause Wi-Fi extender 412 to further store client identification data related to registered client devices and unregistered client devices, to switch operation of Wi-Fi extender 412 from the second mode to the first mode based on receipt of the initiate signal from registered client devices but not to switch operation of Wi-Fi extender 412 from the second mode to the first mode based on receipt of the initiate signal from unregistered client devices.

Radio 520, such as a Wi-Fi WLAN interface radio transceiver, is operable to communicate with client devices 404, 406 and 408, with mobile device 410, and with gateway device 402, as shown in FIG. 4A. Radio 520 includes BC 522, RC 524, one or more antennas, and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Wi-Fi extender 412 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Mobile device 410 includes: a controller 526; a memory 528, which has stored therein a wireless network program 530; and at least one radio, a sample of which is illustrated as a radio 532, which has stored therein a BC 534 and an RC 536; an interface 230; and a display 232.

In this example, controller 526, memory 528, radio 532, interface 230, and display 232 are illustrated as individual devices. However, in some embodiments, at least two of controller 526, memory 528, radio 532, interface 230, and display 232 may be combined as a unitary device. Further, in some embodiments, at least one of controller 526 and memory 528 may be implemented as a computer having tangible computer-readable media for carrying or having computer-executable instructions or data structures stored thereon.

Controller 526, which can include a dedicated control circuit, CPU, microprocessor, etc., controls the circuits of mobile device 410.

Memory 528 can store various programming, and user content, and data as wireless network program data 530. As will be discussed in more detail below, wireless network program data 530 includes instructions that may be used by controller 526 to cause mobile device 410 to associate mobile device 410 with gateway device 402 by way of WLAN 420 so as to enable wireless communication with external network 126 by way of WLAN 420, to determine a first location while WLAN 420 is established, to disassociate from gateway device 402, to determine that a location of mobile device 410 is a predetermined distance from the first location, to transmit an initiate signal to gateway device 402 via external network 126 when the location of mobile device 410 is less than or equal to the predetermined distance from the first location, and re-associate with gateway device 402 by way of WLAN 420 so as to re-enable wireless communication with external network 126 by way of WLAN 420.

Radio 532 may include a Wi-Fi WLAN interface radio transceiver that is operable to communicate with client devices 404, 406 and 408, with Wi-Fi extenders 412 and 414, and with gateway device 402, as shown in FIG. 4A, and also may include a cellular transceiver operable to communicate with mobile service provider 118 through mobile network 126. Radio 532 includes BC 534, RC 536 with one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Mobile device 410 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Any of the client devices within WLAN 420 may be a mobile device similar to mobile device 410. In the event that a client device within WLAN 420 is not a mobile device similar to mobile device 410, such a client device may still include: a controller, which can include a dedicated control circuit, CPU, microprocessor, etc., and that controls the circuits of the client device; a memory, which has stored therein an onboarding program, that is similar to memory 528 and wireless network program 530, respectively, of mobile device 410 discussed above; a radio similar to radio 532 of mobile device 410 discussed above; in additional to further functional circuitry. Accordingly, any of the client devices may include a Wi-Fi WLAN interface radio transceiver, that is operable to communicate with other client devices, with Wi-Fi extenders 412 and 414, and with gateway device 402, as shown in FIG. 4A, and also may include a cellular transceiver operable to communicate with mobile service provider 118 through mobile network 126. Further, any of the client devices may include a radio that is similar to radio 532 of mobile device 410 discussed above. Still further, any of the client devices may be equipped with a radio to implement a Bluetooth interface radio transceiver and antenna, or with a radio meeting RF4CE protocol, Zigbee protocol, and/or IEEE802.15.4 protocol, which also communicates in the ISM band, in a manner similar to mobile device 410 discussed above.

Insofar as gateway device 402 provides connection to service provider 116, such as an MSO, gateway device 402 can be equipped with connectors to connect with a television or display device, and can also include programming to execute an electronic program guide and/or other suitable graphical user interface (GUI), and can with such configuration be referred to as a so-called set top box. Such a set top box can be included in the system shown in FIG. 4A as gateway device 402 or in addition thereto. Moreover, inclusion of one or more of far-field microphones (for e.g., voice command and/or presence recognition, and/or telephone communication), cameras (for e.g., gesture and/or presence recognition, and/or video telephone communication), and speakers, and associated programming, can enable the gateway device to be a so-called smart media device.

Figure 4B:
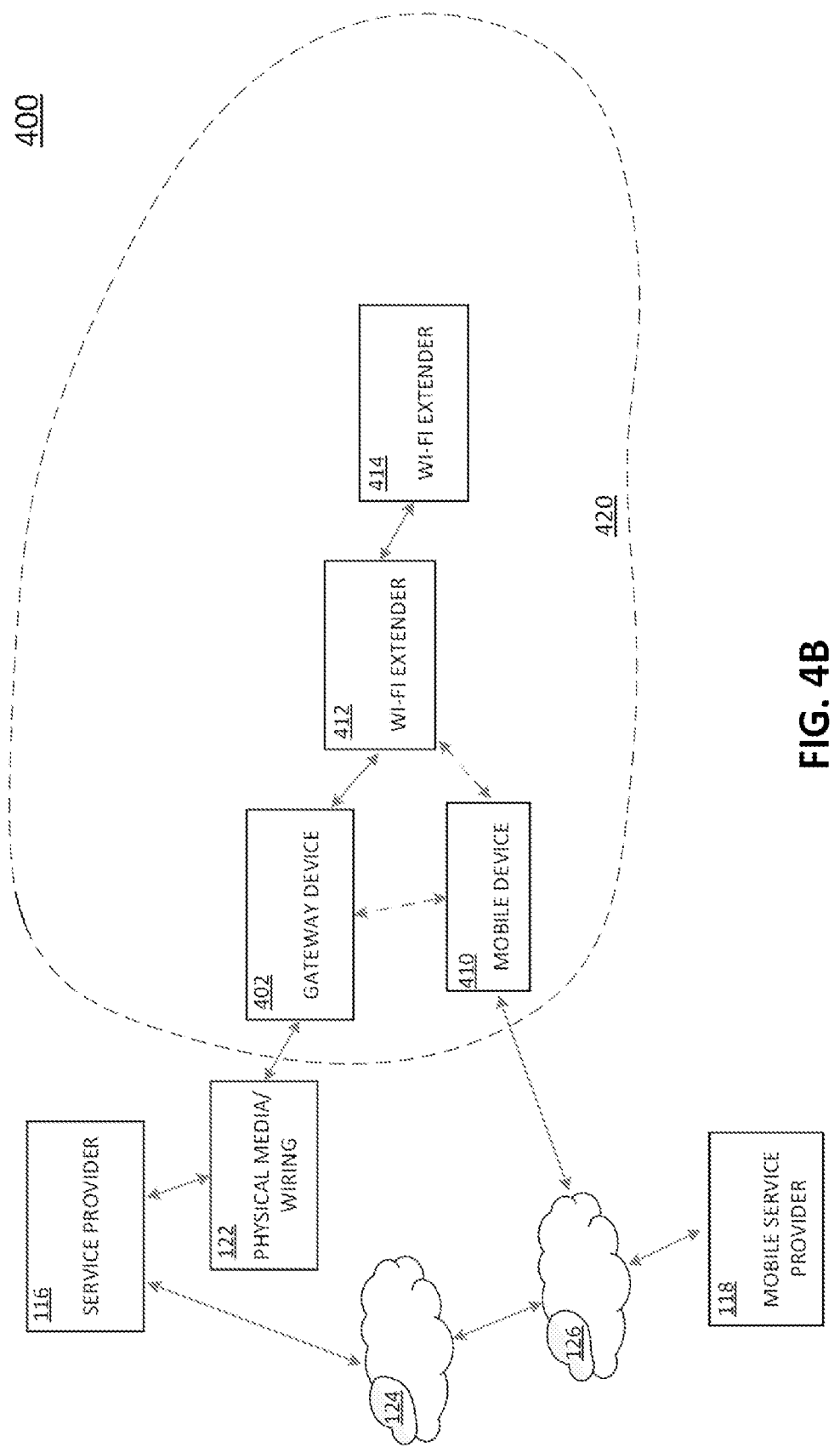
FIG. 4B illustrates the wireless network in FIG. 4A at a time $t_4$.

FIG. 4B illustrates wireless network 400 in FIG. 4A at a time t₄.

FIG. 4B is similar to FIG. 4A; however, client device 404, client device 406, and client device 408 are no longer active in WLAN 420 at time t₄.

In this example, at time t₄, client device 404, client device 406, and client device 408 have disassociated from their respective APDs and, in turn, have disconnected from WLAN 420. However, mobile client 410 remains associated with gateway device 402 and connected to WLAN 420. Therefore, WLAN 420 remains active since there is still one active client in the network. Nevertheless, mobile device 410 may decide to leave WLAN 420 at a later time leaving no clients associated to any APDs in WLAN 420. This will be described in greater detail with reference to FIG. 4C.

Returning to FIG. 3, after the Wi-Fi network has been operating in the first mode (S304), it is determined whether the last client has disassociated from the AP (S306). For example, in FIG. 4B, the HNC resides in gateway device 402, and can determine that there is at least one client still associated with an APD; in this example, mobile device 410 is still associated with gateway device 402.

Returning to FIG. 3, if it is determined that the last client has not disassociated from the Wi-Fi network (S306), then the Wi-Fi network still continues to operate in the first mode (N at S304). However, if it is determined that the last client has disassociated from the Wi-Fi network (Y at S306), then the Wi-Fi network will switch to operate in the second mode (S308). This will be further described with reference to FIG. 4C.

Figure 4C:
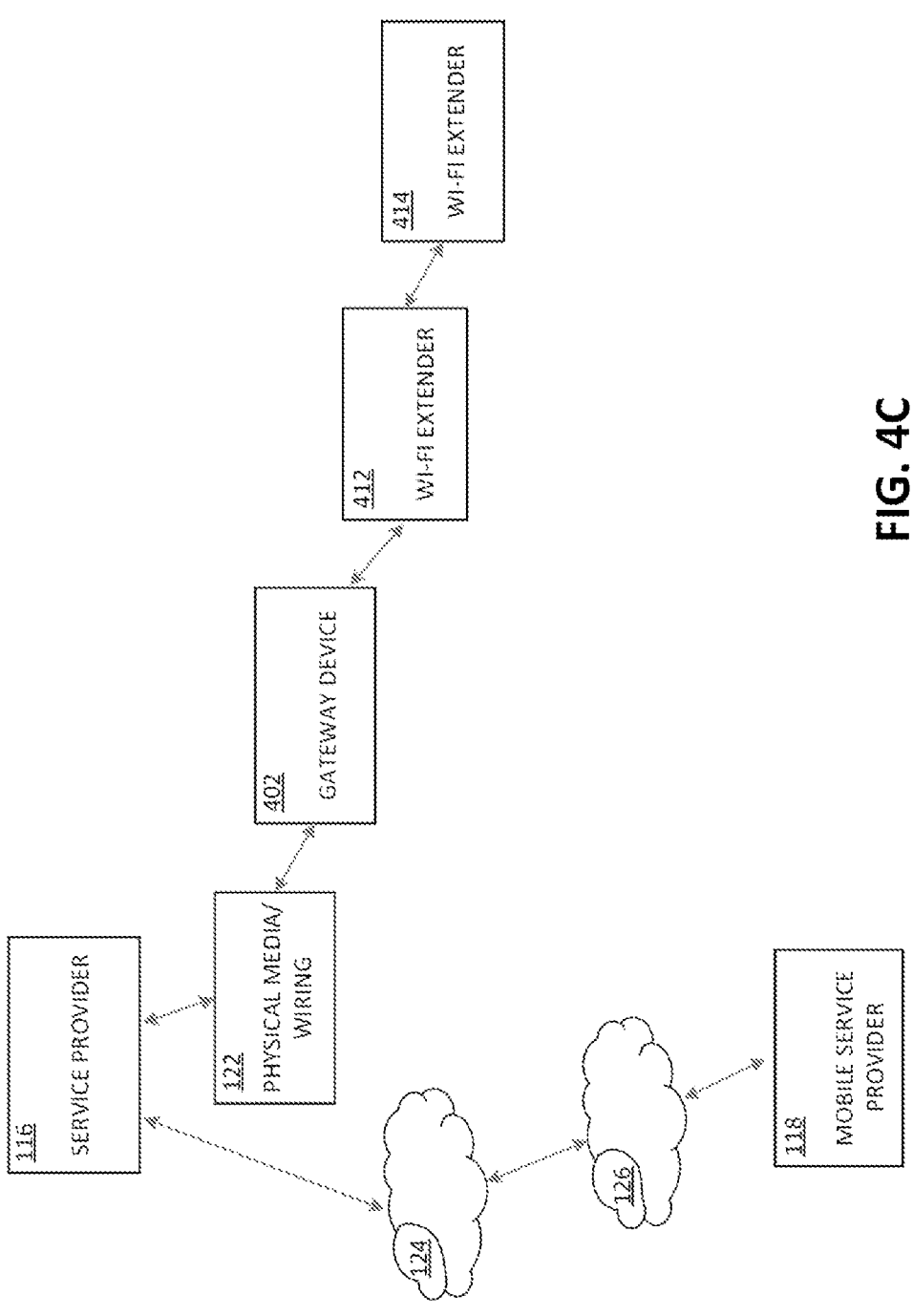
FIG. 4C illustrates the wireless network in FIG. 4A at a time $t_5$.

FIG. 4C illustrates wireless network 400 in FIG. 4A at a time t₅.

FIG. 4C is similar to FIG. 4B; however, mobile client 410 is no longer active at time t₅. Furthermore, WLAN 420 is also no longer active in wireless network 400 at time t₅.

In this example, at time t₅, because all client devices are disassociated, the HNC which resides in gateway device 402 will switch the network to operate in the second mode. In a non-limiting example of embodiment, this second mode is a non-broadcast mode where the radio component in each APDs is disabled, thereby essentially turning off WLAN 420.

Figure 6:
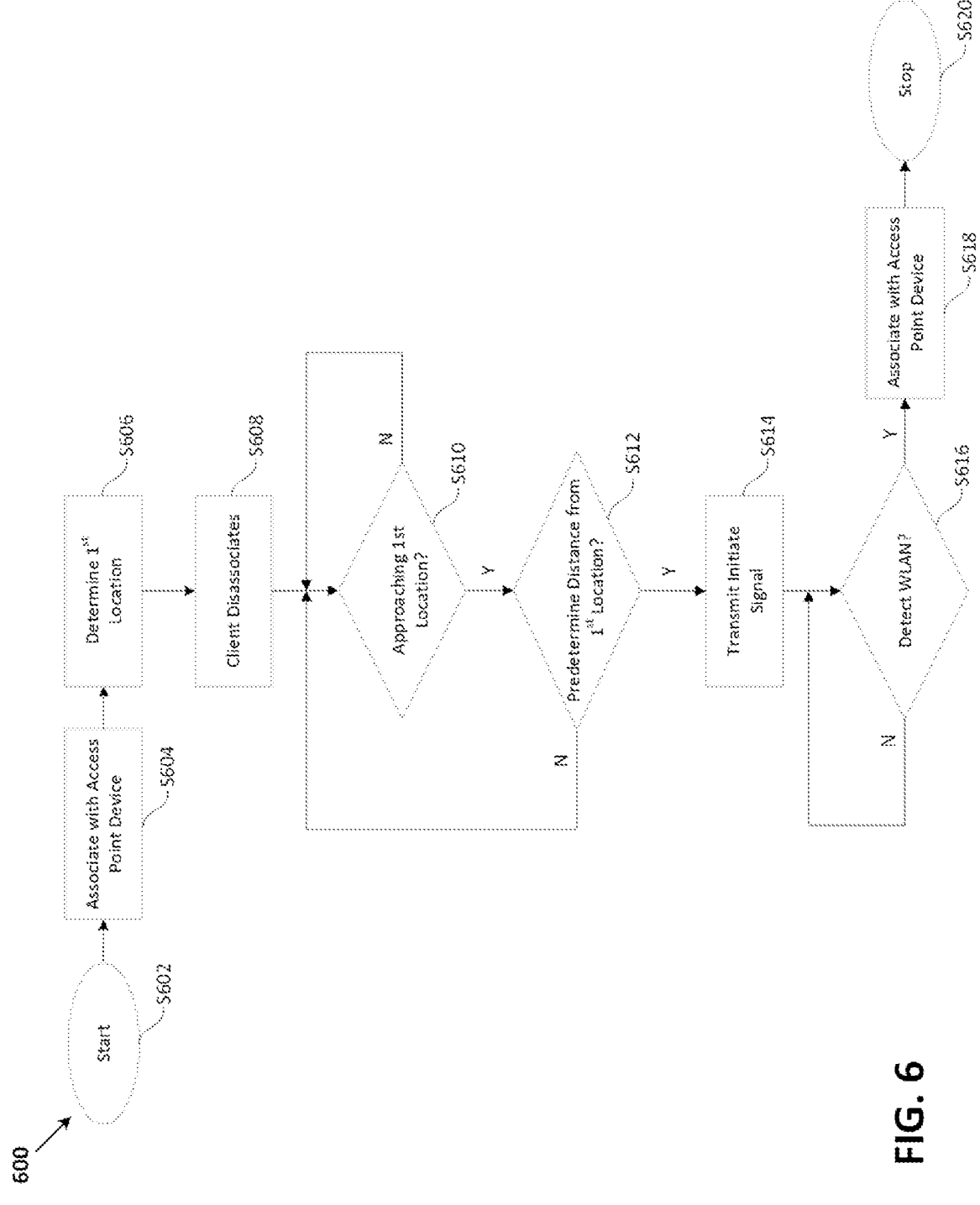
FIG. 6 illustrates another example method for managing operation modes of a mobile device, in accordance with aspects of the current disclosure.

FIG. 6 illustrates an example method 600 for managing operation modes of a mobile device, in accordance with aspects of the current disclosure.

As shown in FIG. 6, method 600 starts (at S602) and the mobile device is associated with the APD (S604). In this example, referring back to FIG. 4A, since mobile device 410 is associated with gateway device 402, it is operating in the first mode and is able to communicate with all APDs and client devices via WLAN 420.

Returning to FIG. 6, after associating with APD (S604), a first location is determined (S606). For example, returning to FIG. 5, controller 526 may determine the location of mobile device 410 by any known method, non-limiting examples of which includes a global positioning system (GPS) or by Wi-Fi triangulation. This first location value is stored in memory 528 and will be used as a reference point whenever mobile device 410 is on the move.

Returning to FIG. 6, after the first location is determined (S606), the mobile device disassociates from the APD by leaving the location (S608). Referring back to FIG. 4A, when mobile device 410 goes beyond the broadcasting reach of radio 508 of gateway device 402, mobile device 410 disassociates from gateway device 402 as is known in the art. If mobile device 410 does not associate with any other APDs in WLAN 420, e.g., Wi-Fi extenders 412 and 414, for example when the user of mobile device 410 leaves a residence being serviced by WLAN 420, then mobile device 410 has disassociated from WLAN 420.

Returning to FIG. 6, after the mobile device disassociated from the APD by leaving the location (S608), it is determined whether the mobile device is approaching the first location (S610). In this scenario, referring back to FIG. 5, controller 526 may periodically determine the location of mobile device 410 by any known method, non-limiting examples of which include a GPS or Wi-Fi triangulation (presuming mobile device 410 is in communication with at least two Wi-Fi access points within some Wi-Fi network). Controller 526 may then compare its current location against the first location stored in memory 528, which corresponds to the location of WLAN 420, to find a compared distance, $d_{cc}$, between its current location and the first location. Similarly, controller 526 would have previously compared its most recently previous location against the first location stored in memory 528, which corresponds to the location of WLAN 420, to find a previous compared distance, $d_{cp}$, between its most recently previous location and the first location. Still further, controller 526 may then compare its next subsequent location against the first location stored in memory 528, which corresponds to the location of WLAN 420, to find a subsequent compared distance, $d_{cs}$, between its next subsequent location and the first location.

A change in the compared distance, $\Delta d_c$, may be defined by the following equation:

$$\Delta d_c = |d_{cc} - d_{cp}| - |i_{cs} - d_{cc}| \tag{1}$$

wherein if $\Delta d_c$ is positive, then mobile device 410 is approaching the first location stored in memory 528, and wherein if $\Delta d_c$ is not positive, then mobile device 410 is not approaching the first location stored in memory 528.

Returning to FIG. 6, if it is determined that the mobile device is not approaching the first location (N at S610), then method 600 continues to determine whether the mobile device is approaching the first location (return to S610). However, if it is determined that the mobile device is approaching the first location (Y at S10), then it is determined whether the mobile device is within a predetermined distance from the first location (S612). For example, as shown in FIG. 5, controller 526 may determine the location of mobile device 410 by any known method, non-limiting examples of which include a GPS or Wi-Fi triangulation (presuming mobile device 410 is in communication with at least two Wi-Fi access points within some Wi-Fi network).

Additionally, stored in memory 528 of mobile device 410 is a distance threshold, $d_{th}$, that is associated with the broadcasting distance of at least one of radio 508 of gateway device 402 and a radio of a Wi-Fi extender of, for example, radio 520 of Wi-Fi extender 412. In other words, the distance threshold, $d_{th}$, is set such that if mobile device 410 is within a distance below $d_{th}$ to gateway device 402 or Wi-Fi extender 412, then mobile device 410 would be able to connect to WLAN 420.

Controller 526 may determine a distance difference, $\Delta d$, between its current location and the first location, as stored in memory 528. If it is determined that $\Delta d$ is less than $d_{th}$, then mobile device 410 is determined to be within the predetermined distance from the first location. If it is determined that $\Delta d$ is not less than $d_{th}$, then mobile device 410 is determined not to be within the predetermined distance from the first location.

Returning to FIG. 6, if it is determined that the mobile device is not within the predetermined distance from the first location (N at S612), then method 600 continues to determine whether the mobile device is approaching the first location (return to S610).

However, if it is determined that the mobile device is within the predetermined distance from the first location (Y at S612), then an initiate signal is transmitted (S614). For example, referring to FIG. 4D, after being determined that it is within the predetermined distance from the first location, mobile device 410 transmits an initiate signal from BC 534 (as shown in FIG. 5) to gateway device 402, by way of mobile service provide 118, mobile network 126, external network 124, service provider 116, and physical media/wiring 122. After receiving the initiate signal, gateway device 402 will transmit a request to all APDs in the network to enable their radios and, in turn, activate WLAN 420 and start transmitting SSID messages.

Returning to FIG. 3, after the Wi-Fi network has been operating in the second mode (S308), it is determined whether or not an initiate signal has been detected (S310). In this scenario, referring to FIG. 4C, wireless network 400 is operating in the second mode whereby all APDs have their radios disabled and WLAN 420 is turned off.

Returning to FIG. 3, if an initiate signal has not been detected (N at S310), then the Wi-Fi network will continue to operate in the second mode (S308). However, if an initiate signal is detected (Y at S310), then the Wi-Fi network will switch to operate in the first mode (S304).

Figure 4D:
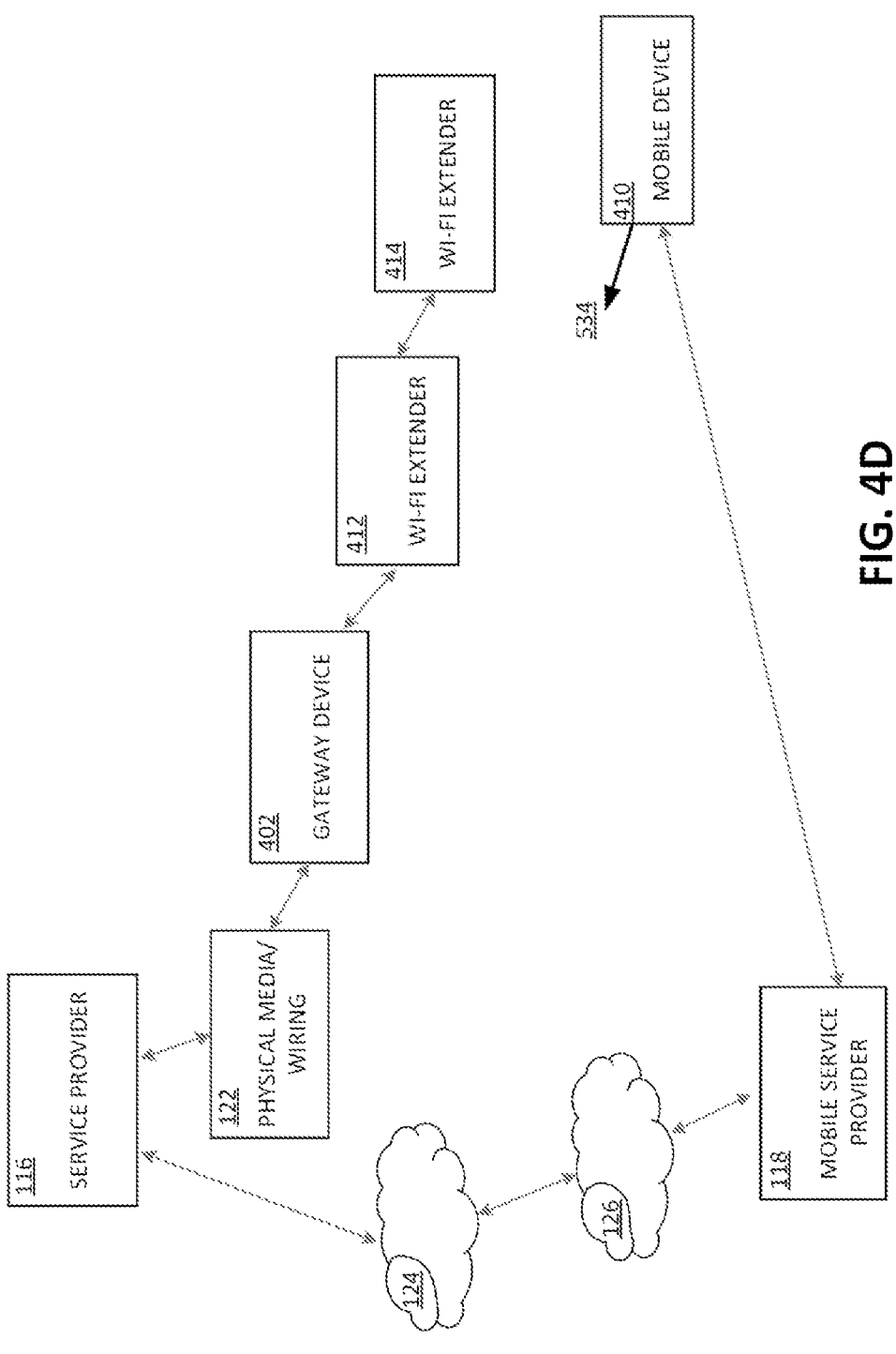
FIG. 4D illustrates the wireless network in FIG. 4A at a time $t_6$.

FIG. 4D illustrates wireless network 400 in FIG. 4A at a time $t_6$.

As shown in FIG. 4D, mobile client 410 is active and all of its communications are directed through mobile service provider 418.

Returning to FIG. 4D, since there is no active client device associated to any APDs, wireless network 400 continues to operate in the second mode. All radio components in all APDs are disabled; therefore, WLAN 420 is turned off. As mobile device 410 moves closer to the predetermined distance from the first location, it transmits an initiate signal destined to gateway device 402 by way of mobile service provider 118.

Returning to FIG. 6, after the initiate signal is transmitted (S614), it is determined whether the WLAN is detected (S616). At this point, referring back to FIG. 4D, mobile device 410 transmits the initiate signal destined to gateway device 402 via mobile service provider 118.

Returning to FIG. 6, if it is determined that the WLAN is not detected (N at S616), then method 600 continues to determine whether the WLAN is detected (return to S616). However, if it is determined that the WLAN is detected (Y at S616), then the mobile device is associated with the APD (S618). Referring back to FIG. 4D, after sending the initiate signal, mobile device 410 will search for WLAN 420 SSID messages. If WLAN 420 is up and active, mobile device 410 will connect to WLAN 420 and associate to one of the APDs available in the network, essentially switching to operate in the first mode. If mobile device 410 cannot detect WLAN 420 initially, mobile device 410 will wait until it receives the SSID broadcast messages from gateway device 402 or one of Wi-Fi extenders 412 and 414.

Returning to FIG. 6, after the mobile device is associated with the APD (S618), method 600 stops (S620).

The processes disclosed herein constitute algorithms that can be affected by software, applications (apps, or mobile apps), or computer programs. The software, applications, or computer programs can be stored on a non-transitory computer-readable medium for causing a computer, such as the one or more processors, to execute the processes described herein and shown in the drawing figures.

In some embodiments where the network has multiple users with different access levels such as registered and unregistered users, a system in accordance with the present disclosure can be configured for a specific user class, for instance registered users, so only registered users have the ability to activate a network in accordance with the present disclosure. For example, referring to FIG. 4D, if mobile device 410 is an unregistered user, when it reaches the predetermined distance from the first location and transmits the initiate signal, gateway device 402 will identify mobile device 410 as an unregistered client and will continue to operate the network in the second mode. All radios in all APDs and gateway device 402 in wireless network 400 would remain disabled, such that WLAN 420 would not be on.

In a conventional wireless network, the APDs broadcast network management messages (SSID messages) to maintain the wireless network even when there are no active clients. This wastes power when no client devices are connected to the network.

In accordance with aspects of the present disclosure, the broadcasting components of the APDs cease broadcasting when the last client device disassociates from the wireless network. Accordingly, less power is wasted. Further, a registered client device is able to remotely initiate the gateway to "restart" the wireless network. Therefore, the wireless network will be up and running when the user of the registered client device returns, such that the registered client device can easily re-associate with an APD of the wireless network. Therefore, from the perspective of the user of the registered client device, there is no disruption of wireless service.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A home network controller for use with a wireless client device and for communicating with an external network, the home network controller being able to receive, via the external network, an initiate signal instructed by the wireless client device, the home network controller comprising:
   a memory;
   a processor configured to execute instructions stored on the memory to cause the home network controller to:
   associate the home network controller with the wireless client device to establish a wireless network,
   communicate with the wireless client device over the wireless network,
   enable the wireless client device to communicate with the external network via the wireless network,
   operate the home network controller in a first mode, and
   operate the home network controller in a second mode,
   an internal communication component configured to communicate with the wireless client device via the wireless network; and
   an external communication component configured to receive the initiate signal;
   wherein the processor is further configured to execute the instructions stored on the memory to cause the home network controller to:
   switch operation of the home network controller from the first mode to the second mode based on a dissociation of the wireless client device, and switch operation of the home network controller from the second mode to the first mode based on receipt of the initiate signal from the external network via the external communication component,
   wherein, in the first mode, a radio of the internal communication component is enabled,
   wherein, in the second mode, the radio of the internal communication component is disabled,
   wherein the memory is configured to store client identification data related to registered client devices and unregistered client devices,
   wherein the processor is configured to switch operation of the home network controller from the second mode to the first mode based on receipt of the initiate signal from registered client devices, and
   wherein the processor is configured not to switch operation of the home network controller from the second mode to the first mode based on receipt of the initiate signal from unregistered client devices.

2. The home network controller of claim 1, wherein the home network controller resides on a gateway device.

3. The home network controller of claim 1, wherein the home network controller resides on an access point device.

4. The home network controller of claim 1,
   wherein the internal communication component is an access point device, and
   wherein, in the second mode, a wireless local area network of the wireless network is off.

5. A method of operating a home network controller for use with a wireless client device and for communicating with an external network, the home network controller being able to receive, via the external network, an initiate signal instructed by the wireless client device, the method comprising:
   associating, via a processor configured to execute instructions stored on a memory, the home network controller with the wireless client device to establish a wireless network;
   communicating, via an internal communication component, with the wireless client device via the wireless network;
   operating, via the processor, the home network controller in a first mode;
   operating, via the processor, the home network controller in a second mode based on a disassociation with the wireless client device;
   receiving, via an external communication component, the initiate signal from the wireless client device via the external network;
   operating, via the processor and based on receipt of the initiate signal, the home network controller in the first mode; and
   storing, via the memory, client identification data related to registered client devices and unregistered client devices,
   wherein, in the first mode, a radio of the internal communication component is enabled,
   wherein, in the second mode, the radio of the internal communication component is disabled,
   wherein the operating the home network controller in the first mode based on receipt of the initiate signal comprises operating the home network controller in the first mode based on receipt of the initiate signal from registered client devices, and
   wherein the operating the home network controller in the first mode based on receipt of the initiate signal comprises not operating the home network controller in the first mode based on receipt of the initiate signal from unregistered client devices.

6. The method of claim 5, wherein the home network controller resides on a gateway device.

7. The method of claim 5, wherein the home network controller resides on an access point device.

8. The method of claim 5, wherein the internal communication component is an access point device, and wherein, in the second mode, a wireless local area network of the wireless network is off.

9. A non-transitory, computer-readable media having computer-readable instructions stored thereon, the computer-readable instructions being capable of being read by a home network controller for use with a wireless client device and for communicating with an external network, the home network controller being able to receive, via the external network, an initiate signal provided by the wireless client device, the computer-readable instructions being capable of instructing the home network controller to perform:

associating, via a processor, the home network controller with the wireless client device to establish a wireless network;

communicating, via an internal communication component, with the wireless client device via the wireless network;

operating, via the processor, the home network controller in a first mode;

selectively disassociating, via the processor, with the wireless client device;

operating, via the processor, the home network controller in a second mode based on a disassociation with the wireless client device;

receiving, via an external communication component, the initiate signal from the wireless client device via the external network;

operating, via the processor and based on receipt of the initiate signal, the home network controller in the first mode; and storing, via a memory, client identification data related to registered client devices and unregistered client devices, wherein, in the first mode, a radio of the internal communication component is enabled, wherein, in the second mode, the radio of the internal communication component is disabled, wherein the operating the home network controller in the first mode based on receipt of the initiate signal comprises operating the home network controller in the first mode based on receipt of the initiate signal from registered client devices, and wherein the operating the home network controller in the first mode based on receipt of the initiate signal comprises not operating the home network controller in the first mode based on receipt of the initiate signal from unregistered client devices.

10. The non-transitory, computer-readable media of claim 9, wherein the home network controller resides on a gateway device.

11. The non-transitory, computer-readable media of claim 9, wherein the home network controller resides on an access point device.

12. The non-transitory, computer-readable media of claim 9, wherein the internal communication component is an access point device, and wherein, in the second mode, a wireless local area network of the wireless network is off.

* * * * *